United States Patent [19]

Humphrey

[11] 3,875,316

[45] Apr. 1, 1975

[54] PREPARATION OF ISOMERIZED HOP EXTRACTS

[75] Inventor: Anthony Martin Humphrey, Uxbridge, England

[73] Assignee: Bush Boake Allen Limited, Walthamstow, England

[22] Filed: Aug. 3, 1972

[21] Appl. No.: 277,848

[30] Foreign Application Priority Data
Aug. 4, 1971 United Kingdom............... 36554/71
Mar. 15, 1972 United Kingdom............... 12064/72

[52] U.S. Cl.................. 426/349, 426/223, 426/429
[51] Int. Cl................................................ C12c 9/02
[58] Field of Search ............ 99/50.5; 426/223, 429, 426/349

[56] References Cited
UNITED STATES PATENTS
3,607,298   9/1971   Mitchell............................... 99/50.5

3,686,316   8/1972   Verzele........................... 99/50.5 X

FOREIGN PATENTS OR APPLICATIONS
1,187,789   4/1970   United Kingdom
1,158,697   7/1969   United Kingdom
  459,708   1/1937   United Kingdom
  296,104    1966    Australia

*Primary Examiner*—David M. Naff
*Attorney, Agent, or Firm*—Flynn & Frishauf

[57] ABSTRACT

Alpha-acids in hop extracts are isomerized by forming a salt of the alpha-acids in a water immiscible organic solvent with a base selected from oxides, hydroxides and carbonates of calcium, magnesium, strontium, barium and zinc and heating the alpha-acid salt in the solvent to form iso-alpha-acid salts. Iso-alpha-acids may be recovered in crude form and used for bittering beer.

18 Claims, No Drawings

PREPARATION OF ISOMERIZED HOP EXTRACTS

The present invention relates to isomerised hop extracts. In the traditional method of brewing, hops are boiled with unfermented beer (wort) to extract certain sparingly soluble soft resins known as α-acids (humulones). These are partially converted by the boiling wort into iso-α-acids (isohumulones) which are more soluble and which are principally responsible for the bitter flavour of beer.

Hops are expensive to store, and subject to deterioration. Moreover, the boiling wort only isomerises and extracts a relatively small proportion of the total α-acid content. To improve the efficiency and consistency of bittering it has been proposed to extract the α-acids from the hops with organic solvents, heat the extract with alkali to isomerise the α-acids and add the isomerised extract to wort or preferably to fermented beer.

The manufacture of isomerised hop extracts has been subject to problems. The original solvents extract many hop constituents which are undesirable in brewing. Further, the alkaline isomerisation is slow, not fully efficient, and can cause deterioration of the iso-α-acids if prolonged. For these reasons, the duration of the alkaline treatment is critical, and it has been difficult to effect quantitive isomerisation of the α-acids.

A further problem has been the presence in the extracts of various insoluble or sparingly soluble resins, including the β-acids (also called lupulones) which can interfere with the dispersion or dissolution of the extract in beer. It has been found necessary to separate the α-acids from these resins as far as possible, prior to isomerisation.

The close similarity between the acidities and solubilities of the desired and unwanted resins has made this a difficult problem.

Hitherto, α-acids have been isomerised in aqueous alkaline solution or according to a recent proposal in a dilute aqueous methanolic or ethanolic alkaline solution. The latter proposal notes that the presence of a catalytic quantity of calcium or magnesium is advantageous (B.P. 1,158,697)

We have now discovered, quite unexpectedly, that α-acids can be isomerised in solution in organic solvents including as preferred examples, water immiscible solvents, by the action of bases e.g. oxides or hydroxides or carbonates of metals or organic bases. This novel isomerisation employs these bases, not as catalysts but as substantially stoichiometric reagents. The novel method proceeds very rapidly to substantial completion so that the isomerisation may be performed on an umpurified hop extract with reduced risk of degradation e.g. saponifying the fatty esters. By suitable choice of reagent and solvent the risk of degradation of the iso-α-acids subsequent to isomerisations may be greatly reduced.

Our invention provides a method for the isomerisation of α-acids which comprises contacting a solution of a hop extract containing α-acids, β-acids and hop oils dissolved in an organic solvent, with sufficient of a base to form a salt of the α-acids and heating the mixture sufficiently to form the corresponding salt of the iso-α-acids, and separating the iso-α-acids from the β-acids and hop oils.

The reaction can be carried out in a wide range of solvents and also with a wide range of bases. However, the rate of reaction varies according to the solvent and base selected and for commercial reasons it is advantageous to use a combination giving a fast reaction free from unwanted side reactions or degradations. For this reason we prefer to use non-water miscible solvents such as toluene, benzene, xylene or petroleum hydrocarbons, in conjunction with alkaline earth metal compounds such as calcium or preferably magnesium oxide or hydroxides.

The reaction is also operable with other water immiscible solvents including esters such as ethyl acetate, ketones such as methyl isobutyl ketone, halocarbons such as $CH_2CL_2$, $CHCL_3$, $CH_2CLCH_2CL$ and $CCL_2=CHCL$, and ethers such as diethyl ether. The reaction also proceeds in some water-miscible solvent including ethyl cellosolve, butanol, acetone and propylene glycol. The reaction is also possible in basic solvents such as pyridine. While it will take place in methanol and ethanol, these last mentioned solvents are very much less preferred since it has been found more difficult to control the reaction and avoid degradation of the product in these solvents.

We have, however, discovered that a particularly suitable solvent for use in the isomerisation is a mixture of a hydrocarbon solvent and a lower alcohol. For example a mixture of toluene, benzene, xylene, petroleum, iso-octane, cyclo hexane or hexane with methanol, ethanol, methylated spirits or isopropanol, may be employed. Preferably the hydrocarbon constitutes at least 30% and most preferably 60 – 40% by weight of the mixture (e.g. 50%. The preferred hydrocarbon is toluene or 110° to 120° C boiling point petroleum and the preferred alcohol is methanol or ethanol.

The base may be any base which is strong enough to form a soluble salt of α-acids. For example oxides, hydroxides or carbonates of barium, strontium, lithium, sodium, potassium, zinc or aluminium may be used as may strong organic bases. The reaction will even proceed slowly on merely dissolving the α-acids in pyridine.

The rate of reaction is in some cases influenced by the presence of water. For example, while calcium hydroxide will react when used in conjunction with a toluene solution of hop extract without addition of water, magnesium hydroxide used under the same conditions gives only a slow reaction unless a little water is added. In other cases an excess of water may be undesirable.

According to a second embodiment our invention provides a method of isomerising α-acids which comprises contacting a solution of a hop extract containing α-acids in a water immiscible organic solvent with sufficient base to form a salt of the α-acids and heating the mixture sufficiently to form the corresponding salt of iso-α-acids.

The isomerisation according to the second embodiment of our invention may be performed on pure or partially purified natural or synthetic α-acids, but a particular advantage of the invention is that it may be applied to a crude solvent extract of hops containing all or most of the constituents extracted from hops by organic solvents.

When the reaction is carrried at in non polar solvents, the iso-α-acids largely precipitate as their salts, which may be redissolved in a solvent such as ethanol or methanol and the metallic ion removed by the addition of an appropriately strong acid e.g. hydrochloric acid. In other cases the salts remain in solution and the metal ion is removed simply by the addition of an appropriately strong acid. The iso-α-acids or their salts so obtained can be separated from most of the other water insoluble resins and fatty acids more readily than the original α-acids, by virtue of their high acidity and different solubility characteristics. Preferably the hops, green or oasted, are ground and extracted with organic solvents in the usual manner. It is possible to use as solvent any liquid hydrocarbon, halogenated hydrocarbon, alcohol, ketone or other convenient solvent for the α-acids e.g. petroleum, benzene, dichloromethane, methanol or acetone, recover the extract from the extracting solvent, e.g. by evaporation and redissolve the recovered extract in a suitable solvent prior to isomerisation. It can be advantageous to carry out the isomerisation on a solution of the crude extract in the primary extracting solvent. The water-immiscible solvent is preferably a hydrocarbon e.g. petroleum ether, benzene, toluene or xylene. The solution of extract may be concentrated by evaporation to from 1 to 20% by weight of α-acids.

The base is preferably a basic compound of calcium or magnesium e.g. oxide or hydroxide. The process is operable with calcium hydroxide under moist or anhydrous conditions, but if magnesium hydroxide or oxide or calcium oxide is used it is desirable that there should also be some water present to assist the reaction. Barium, strontium, aluminum and other chemically related metals are to some extent effective but are less preferable on ground of toxicity, cost, or reduced effectiveness. It is possible to use alkali metal, hydroxides or carbonates of for example lithium, sodium or potassium. However, these are generally less preferred than the milder alkalis.

The proportion of base is preferably substantially stoichiometric based on the α-acids. When the proportion is less than stoichiometric it is not possible to achieve a substantially quantitivve isomerisation of the α-acids, but only that proportion corresponding to the proportion of base based on the stoichiometric requirement. Undue excess, while not particularly harmful to the reaction or product, is undesirable for commercial or practical reasons.

Upon addition of the base to a solution containing α-acids, isomerisation is very slow at ambient temperature but increases as temperature is raised. In order to obtain substantially quantitive isomerisation it is desirable to heat the mixture preferably to boiling point and continue heating until the isomerisation is complete. The time is not critical when the process is conducted in our preferred solvents, shorter times being possible if a lower conversion can be tolerated and longer times being to some extent permissible (although of no commercial advantage) in view of the low risk of degrading the salt of the iso-α-acids.

After isomerisation in a water immiscible solvent it is desirable to recover the iso-α-acids in a water soluble form and preferably free from undesirable hop constituents. Therefore to secure optimum yield of purified iso-α-acids, it is necessary to adopt an extraction procedure. We therefore prefer to redissolve the precipitate in situ by adding a solvent for the salts of iso-α-acids directly to the suspension. The most convenient solvents are water-miscible alcohols, especially methanol. Sufficient solvent having been added to redissolve the suspended organic matter, the base may be displaced by addition of a strong aqueous acid. Any acid which is stronger than iso-α-acid and which does not cause degradation of the iso-α-acids can be used. We have found hydrochloric acid to be particularly satisfactory, but we do not exclude the use of other suitable acids. Preferably the acid is added in slight excess.

The displaced base forms a salt with the added acid and either precipitates or passes into the aqueous methanol phase depending on the acid employed. In either case it is readily separated by filtration or by separting the liquid.

The liberated iso-α-acids pass into the water immiscible phase. In any event the aqueous alcoholic phase is separated from the water-immiscible phase, containing the isoi-α-acids.

The iso-α-acids may conveniently be separated from the water-immiscible solvent by extraction with aqueous alkali at a pH preferably between 7 and 8. Aqueous alkali metal carbonates or bicarbonates are preferred. In order to obtain a water soluble product it is preferred to employ potassium as the alkali metal. The iso-α-acids pass into the aqueous phase as alkali salts. Provided the pH does not exceed 8, the greater part of the undesirable hop components, including most of the fixed oils, essential oils, fatty acids and the β-acids and other less acidic soft and hard resins, remain in the water-immiscible solvent.

The aqueous solution of the iso-α-acids may be concentrated, for example by evaporation under vacuum to any desired degree, or preferably by extraction with a polar water-immiscible solvent as described in British Pat. application No. 1187789. Preferably the final product comprises an aqueous solution of iso-α-acids as their potassium salt containing from 10 to 60% iso-α-acids and substantially free from β-acids, xanthohumol, fixed oil and fatty acids.

The product may be added to wort or preferably to fermented beer.

As an alternative to the foregoing where for example calcium, zinc or preferably magnesium was employed, the solvent may be removed from the reaction mixture, e.g. by distillation to yield a crude isomerised extract containing the metal salts of isohumulones which may be added to beer or wort as such, or as an aqueous suspension.

We have discovered that it is possible to isomerise a crude hop extract according to our invention and to add the isomerised crude extract to wort. This method has some advantages provided the extract is added to the wort near the end of the normal boiling period, and just prior to fermentation. The crude isomerised extract should preferably be added as nrly as possible at the end of the wort boiling, allowing just sufficient subsequent boiling to disperse the extract in the beer, e.g. from ½ minute to 2 minutes, preferably 1 minute. Desirably the extract is not boiled for more than 5 minutes after addition of the extract.

For example a crude extract may be isomerised according to our invention with, say, magnesium oxide. The product may either be steam or vacuum distilled to remove all solvents and used as the crude magnesium salt, or alternatively it maybe acidified with, e.g. aqueous hydrochloric acid, and the aqueous phase containing the magnesium separated leaving the crude organic phase containing the iso-α-acids. The latter may be made alkaline with, for example, potassium carbonate solution and evaporated to remove the organic solvents, or evaporated directly to yield a crude isomerised extract containing free iso-α-acids.

Our invention therefore further provides a crude isomerised extract comprising magnesium salts or iso-α-acids, β-acids and hop oils.

It also provides a method of bittering beer which comprises adding a crude hop extract comprising iso-α-acids or their alkali metal or alkaline earth metal salts, β-acids and hop oils to wort, within 5 minutes of the termination of the wort boiling stage of brewing, prior to fermentation.

The invention is illustrated by the following examples:

EXAMPLE 1

Crude hop extract (50 Gm) obtained by extracting hops with benzene and containing 34.8% by weight of α-acids, was dissolved in toluene (200 Ml). To this solution was added magnesium hydroxide (3Gm) and water (1M1). With constant stirring, the temperature was raised to boiling point and boiling continued for 1 minute. Stirring was continued while the mixture was cooled to 50° C. Methanol (150 Ml) was then added followed by 5N.Hydrochloric acid (50 Ml). Stirring was continued for 5 minutes and the phases then allowed to separate. The lower layer was run off and further extracted with toluene (3 × 5 Ml). The toluene solutions were combined (total volume 400 Ml) and analysed by countercurrent-distribution analysis. This analysis indicated 4.14% w/v iso-α-acids in solution. Representing a conversion of 95% of the α-acids in the original hop extract into iso-α-acids in toluene solution. The bulked toluene solutions were extracted with four portions of 3½% aqueous potassium bicarbonate solutions ( 250, 100, 100 and 50 Ml) at 60° C. The bulked aqueous alkaline solution was backwashed with toluene (50 Ml) and subsequentlly extracted with three portions of methyl iso-butyl ketone. (150, 100 and 50 Ml). The bulked organic solution was desolventized using water to yield a pale mobile aqueous extract of potassium iso-α-salts. The final product weighed 65g and contained 22% iso-α-acids representing an overall conversion of 82%.

EXAMPLE 2

Crude hop extract (50 Gm), obtained by extracting hops with benzene and containing 34.870 by weight of α-acids was dissolved in petroleum ether (200 Ml). (b.r. 75°–95° C, grade S.B.P.2.) To this solution was added, with stirring calcium hydroxide B.P. (6g.) and the mixture boiled for 30 minutes. During the boiling process, a precipitate consisting mainly of the calcium salts of iso-α-acids was formed. The mixture was cooled to 50° C and methanol (150 Ml) and 5N.hydrochloric acid (50 Ml) was added. Stirring was continued until all of the precipitate had dissolved. The phases were then allowed to separate. The lower layer was run off and re-extracted with petroleum ether (Grade S.B.P.2.,3 quantities each 50 Ml). The petrol solutions were combined (total 400 Ml) and were found to contain 4.0% iso-α-acids by counter-current distribution analysis. This represents a conversion of 90% of the α-acids in the original hop extract into iso-α-acids in petrol solution. The petrol solutions were extracted with three portions of 2% aqueous potassium bicarbonate solution (250, 150 and 100 ml) at 60° C. The bulked aqueous alkaline solution was backwashed with petrol (50 Ml) and subsequently extracted with three portions of ethyl acetate (200, 150 and 100 Ml). The bulked organic solution was disolventized using water to yield a pale, mobile, aqueous extract of potassium iso-α-salts. The final product weighed 45.5g and contained 24.5% iso-α-acids representing an overall conversion of 64%.

EXAMPLE 3

Crude hop extract (50g) was heated with calcium hydroxide (6g) in various solvents (200ml) and the rate and specificity of isomerisation was noted. See Table 1. In a further series of experiments the extract was dissolved in toluene and heated with various bases and the rate and specificity of isomerization was noted. See Table 2.

Table 1

| Solvent | Rate | BP of solution | Comments |
| --- | --- | --- | --- |
| Toluene | V.Fast | 98°C | No by-products |
| Petroleum ether 60/80 | Slow | 65°C | Not complete after 45 minutes. Insoluble reject. |
| 900 Octane | Slow | 98°C | Almost complete after 45 minutes. Insoluble reject. No humulinic acid. |
| Ethyl Acetate | Fast | 72°C | Formation of humulinic acid. |
| Methanol | Slow | 65°C | Not complete after 45 minutes. Insoluble reject. Humulinic acid formed. |
| Butanol | V.Fast | 91°C | Trace of humulunic acid. |
| Acetone | V.Slow | 57°C | Reaction almost negligable. |
| Methyl iso butyl ketone. | V.Fast | 102°C | Trace of humulinic acid. |
| Cyclo hexanone | V.Fast at 100°C | Not raised to BP. | No by-products |
| Methylene chloride | Moderate | 40°C | Complete after 45 minutes No by-products. |
| Chloroform | do. | 62°C | do. |
| Ethylene dichloride | do. | 80°C | do. |
| Trichloroethylene | Fast | 84°C | Complete after 5 minutes No by-products. |
| Diethyl ether | V.Slow | 35°C | Reaction almost negligable |
| Ethyl cellosolve | V.Fast at 100°C | Not raised to BP. | No by-products |
| Propylene glycol | Fast at 100°C | do. | Complete after 20 minutes. No by-products |

Table 1 — Continued

| Solvent | Rate | BP of solution | Comments |
| --- | --- | --- | --- |
| Pyridene | V. Fast | 95°C | No by-products |
| Methylated spirit | Slow | 77°C | Not complete after 45 minutes. Insoluble reject. Humulinic acid formed. |
| Isclon 113 | Slow | 52°C | Incomplete after 45 minutes. Insoluble reject. |

Table 2 (All in toluene)

| Base | Rate | Comments |
| --- | --- | --- |
| Calcium hydroxide | V. Fast | |
| Magnesium hydroxide | V. Fast | Requires traces of water. |
| Magnesium oxide | V. Fast | do. |
| Strontium oxide (hydrate) | do. | |
| Barium oxide (hydrate) | do. | |
| Barium oxide (anhydrous) | do. | |
| Calcium carbonate | Slow. | Incomplete after 45 minutes. |
| Magnesium carbonate | do. | do. |
| Barium carbonate | do. | do. |
| Lithium hydroxide (hydrate) | do. | do. |
| Lithium carbonate | do. | do. |
| Sodium hydroxide | do. | do. even after addition of water. |
| Sodium carbonate | Fast | Complete without formation of humunlinic acid but extensive formations of tar. |
| Potassium carbonate | do. | |
| Potassium hydroxide | Slow | Incomplete after 45 minutes even after addition of water. |
| Potassium bicarbonate | Zero | |
| Sodium bicarbonate | do. | |
| Zinc oxide (anhydrous) | Slow | Incomplete after 45 minutes. |
| Zinc oxide & water | do. | do. |
| Zinc carbonate | Fast | |
| Aluminium oxide & water | Slow | Incomplete after 45 minutes. |
| Aluminium hydroxide | do. | do. |
| Triethanolamine | do. | do. |

We claim:

1. A method of isomerizing α-acids which comprises contacting a solution consisting essentially of an α-acids-containing unisomerised hop extract in a water immiscible organic solvent with a substantially stoichiometric amount of a base selected from the group consisting of the oxides, hydroxides and carbonates of calcium, magnesium, strontium, barium and zinc, to form the corresponding salt of the α-acids and heating the mixture sufficiently to form the corresponding salt of the iso-α-acids, and recovering an isomerised hop extract containing said salt of the iso-α-acids from the water immiscible solvent.

2. A method according to claim 1, wherein said unisomerised hop extract contains α-acids, β-acids and hop oils.

3. A method according to claim 2, wherein said water immiscible solvent is selected from the group consisting of toluene, benzene, xylene and petroleum hydrocarbons.

4. A method according to claim 3, wherein free iso-α-acids are formed after the isomerisation in the water immiscible solvent by redissolving any precipitate with addition of (i) a water immiscible lower alcohol, (ii) sufficient water to form a separate aqueous alcoholic layer, and (iii) sufficient acid to release free iso-α-acids in a water immiscible layer, and separating the aqueous alcoholic layer from the water immiscible layer.

5. A method according to claim 4, wherein a crude isomerised extract is recovered from the water immiscible layer by evaporation.

6. A method according to claim 4, wherein the water immiscible layer is contacted with aqueous alkali at a pH sufficient to extract the iso-α-acids as their alkali metal salts into an aqueous phase but not sufficient to extract β-acids as their alkali metal salts into the aqueous phase.

7. A method for isomerising α-acids which comprises contacting a solution consisting essentially of an α-acids containing unisomerised hop extract in a mixture of a hydrocarbon solvent and a lower alcohol with a substantially stoichiometric amount of a base selected from the group consisting of the oxides, hydroxides and carbonates of calcium, magnesium, strontium, barium and zinc, to form the corresponding salt of the α-acids, heating the mixture sufficiently to form the corresponding salt of the iso-α-acids and recovering an isomerised hop extract from the mixture.

8. A method according to claim 7, wherein said unisomerised hop extract contains α-acids, β-acids and hop oils.

9. A method according to claim 8, wherein the hydrocarbon solvent is present in a proportion of from 40 to 60% by weight of the total of said hydrocarbon solvent and alcohol.

10. A method according to claim 9, wherein the hydrocarbon solvent is selected from the group consisting of toluene, benzene, xylene and petroleum hydrocarbons.

11. A method according to claim 10, wherein the lower alcohol is methanol or ethanol.

12. A method according to claim 10, wherein after isomerisation sufficient water is added to the mixture to form a separate aqueous alcoholic layer and the mixture is acidified sufficiently to release free iso-α-acids in the hydrocarbon solvent, and the aqueous alcoholic layer is separated.

13. A method according to claim 10, wherein the hydrocarbon solvent is removed and a crude isomerized extract is recovered.

14. A method according to claim 12, wherein the hydrocarbon solvent is contacted with an aqueous alkali at a pH sufficient to extract the iso-α-acids as alkali metal salts into an aqueous phase but not sufficient to extract β-acids into the aqueous phase as their alkali metal salts.

15. A method according to claim 14, wherein the aqueous alkali is potassium carbonate solution.

16. A method for bittering beer which comprises adding said isomerized hop extract containing said salt of the iso-α-acids recovered from said water immiscible solvent prepared in accordance with the method of claim 2, to wort within about 5 minutes prior to the termination of the wort boiling stage of brewing prior to fermentation.

17. A method for bittering beer which comprises adding crude hop extract comprising iso-α-acids, β-acids and hop oils prepared in accordance with the method of claim 5 to wort within about 5 minutes prior to the termination of the wort boiling stage of brewing prior to fermentation.

18. A method for bittering beer which comprises adding crude hop extract comprising iso-α-acids, β-acids and hop oils prepared in accordance with the method of claim 13 to wort within about 5 minutes prior to the termination of the wort boiling stage of brewing prior to fermentation.

* * * * *